(12) United States Patent    (10) Patent No.:     US 9,003,171 B2
Gonion                       (45) Date of Patent:      Apr. 7, 2015

(54) PAGE FAULT PREDICTION FOR PROCESSING VECTOR INSTRUCTIONS

(75) Inventor: Jeffry E. Gonion, Campbell, CA (US)

(73) Assignee: Apple Inc., Cupertino, CA (US)

( * ) Notice: Subject to any disclaimer, the term of this patent is extended or adjusted under 35 U.S.C. 154(b) by 958 days.

(21) Appl. No.: 13/167,630

(22) Filed: Jun. 23, 2011

(65) Prior Publication Data

US 2011/0320749 A1    Dec. 29, 2011

Related U.S. Application Data

(60) Provisional application No. 61/357,669, filed on Jun. 23, 2010.

(51) Int. Cl.
 *G06F 12/10*  (2006.01)
 *G06F 9/30*   (2006.01)

(52) U.S. Cl.
 CPC ...... *G06F 12/1027* (2013.01); *G06F 2212/654* (2013.01)

(58) Field of Classification Search
 CPC combination set(s) only.
 See application file for complete search history.

(56) References Cited

U.S. PATENT DOCUMENTS

| 5,680,565    | A  | * | 10/1997 | Glew et al.    | 711/205 |
|--------------|----|---|---------|----------------|---------|
| 5,790,821    | A  | * | 8/1998  | Pflum          | 712/200 |
| 6,260,131    | B1 | * | 7/2001  | Kikuta et al.  | 711/210 |
| 6,775,747    | B2 | * | 8/2004  | Venkatraman    | 711/137 |
| 7,383,418    | B2 | * | 6/2008  | Janik et al.   | 711/216 |
| 8,307,191    | B1 | * | 11/2012 | Jain           | 711/206 |
| 2007/0255894 | A1 | * | 11/2007 | Hessel et al.  | 711/105 |
| 2008/0288745 | A1 | * | 11/2008 | Gonion et al.  | 712/4   |

* cited by examiner

*Primary Examiner* — Eric Coleman

(74) *Attorney, Agent, or Firm* — Park, Vaughan, Fleming & Dowler LLP

(57) ABSTRACT

A system including a processor that handles a TLB miss while executing a vector read instruction in a processor is described herein. During operation, the processor performs a lookup in a TLB for addresses in active elements in the vector read instruction. The processor then determines that a TLB miss occurred for the address from an active element other than a first active element. Upon predicting that a page table walk for the vector read instruction will result in a page fault, the processor sets a bit in a corresponding bit position in an FSR. A set bit in a bit position in FSR indicates that data in a corresponding element of the vector read instruction is invalid. The processor then immediately performs memory reads for at least one of the first active element and other active elements for which TLB misses did not occur.

30 Claims, 3 Drawing Sheets

PAGE FAULT PREDICTION FOR PROCESSING VECTOR INSTRUCTIONS

RELATED APPLICATIONS

This application is a non-provisional application from, and hereby claims priority under 35 U.S.C. §120 to, U.S. provisional patent application 61/357,669, entitled "Page Fault Prediction for Processing Vectors," by inventor Jeffry E. Gonion and Keith E. Diefendorff, filed on 23 Jun. 2010.

This application is related to: (1) pending application Ser. No. 13/106,775, entitled "Predicting a Result for a Predicate-Generating Instruction when Processing Vector Instructions," by inventor Jeffry E. Gonion, filed 12 May 2011; (2) pending application Ser. No. 13/090,964, entitled "Predicting a Result for an Actual Instruction when Processing Vector Instructions," by inventor Jeffry E. Gonion, filed 20 Apr. 2011; (3) Ser. No. 13/090,961, entitled "Sharing a Fault-Status Register when Processing Vector Instructions," by inventor Jeffry E. Gonion, filed 20 Apr. 2011; (4) pending application Ser. No. 13/090,131, entitled "Predicting a Pattern in Addresses for a Memory-Accessing Instruction when Processing Vector Instructions," by inventor Jeffry E. Gonion, filed 19 Apr. 2011; (2) pending application Ser. No. 13/090,001, entitled "Predicting a Result of a Dependency-Checking Instruction when Processing Vector Instructions," by inventor Jeffry E. Gonion, filed 19 Apr. 2011.

This application is related to: (1) pending application Ser. No. 12/419,629, entitled "Method and Apparatus for Executing Program Code," by inventors Jeffry E. Gonion and Keith E. Diefendorff, filed on 7 Apr. 2009; (2) pending application Ser. No. 12/419,644, entitled "Break, Pre-Break, and Remaining Instructions for Processing Vectors," by inventors Jeffry E. Gonion and Keith E. Diefendorff, filed on 7 Apr. 2009; (3) pending application Ser. No. 12/419,661, entitled "Check-Hazard Instructions for Processing Vectors," by inventors Jeffry E. Gonion and Keith E. Diefendorff, filed on 7 Apr. 2009; (4) pending application Ser. No. 12/495,656, entitled "Copy-Propagate, Propagate-Post, and Propagate-Prior Instructions For Processing Vectors," by inventors Jeffry E. Gonion and Keith E. Diefendorff, filed on 30 Jun. 2009; (5) pending application Ser. No. 12/495,643, entitled "Shift-In-Right Instructions for Processing Vectors," by inventors Jeffry E. Gonion and Keith E. Diefendorff, filed on 30 Jun. 2009; (6) pending application Ser. No. 12/495,631, entitled "Increment-Propagate and Decrement-Propagate Instructions for Processing Vectors," by inventors Jeffry E. Gonion and Keith E. Diefendorff, filed on 30 Jun. 2009; (7) pending application Ser. No. 12/541,505, entitled "Running-Sum Instructions for Processing Vectors," by inventors Jeffry E. Gonion and Keith E. Diefendorff, filed on 14 Aug. 2009; (8) pending application Ser. No. 12/541,526, entitled "Running-AND, Running-OR, Running-XOR, and Running-Multiply Instructions for Processing Vectors" by inventors Jeffry E. Gonion and Keith E. Diefendorff, filed on 14 Aug. 2009; and (9) pending application Ser. No. 12/541,546, entitled "Running-Shift Instructions for Processing Vectors," by inventors Jeffry E. Gonion and Keith E. Diefendorff, filed 14 Aug. 2009.

This application is also related to: (1) pending application Ser. No. 12/873,043, entitled "Running-Min and Running-Max Instructions for Processing Vectors," by inventors Jeffry E. Gonion and Keith E. Diefendorff, filed 31 Aug. 2010; (2) pending application Ser. No. 12/873,063, entitled "Non-Faulting and First-Faulting Instructions for Processing Vectors," by inventors Jeffry E. Gonion and Keith E. Diefendorff, filed 31 Aug. 2010; (3) pending application Ser. No. 12/873,074, entitled "Vector Test Instruction for Processing Vectors" by inventors Jeffry E. Gonion and Keith E. Diefendorff, filed 31 Aug. 2010; (4) pending application Ser. No. 12/907,471, entitled "Select First and Select Last Instructions for Processing Vectors," by inventors Jeffry E. Gonion and Keith E. Diefendorff, filed 19 Oct. 2010; (5) pending application Ser. No. 12/907,490, entitled "Actual Instruction and Actual-Fault Instructions for Processing Vectors," by inventors Jeffry E. Gonion and Keith E. Diefendorff, filed 19 Oct. 2010; (6) pending application Ser. No. 12/977,333, entitled "Remaining Instruction for Processing Vectors," by inventors Jeffry E. Gonion and Keith E. Diefendorff, filed 23 Dec. 2010; and (7) pending application Ser. No. 13/006,243, entitled "Generate Predictes Instruction for Processing Vectors," by inventors Jeffry E. Gonion and Keith E. Diefendorff, filed 13 Jan. 2011.

This application is also related to: (1) pending application Ser. No. 12/237,212, entitled "Conditional Data-Dependency Resolution in Vector Processors," by inventors Jeffry E. Gonion and Keith E. Diefendorff, filed 24 Sep. 2008; (2) pending application Ser. No. 12/237,196, entitled "Generating Stop Indicators Based on Conditional Data Dependency in Vector Processors," by inventors Jeffry E. Gonion and Keith E. Diefendorff, filed 24 Sep. 2008; and (3) pending application Ser. No. 12/237,190, entitled "Generating Predicate Values Based on Conditional Data Dependency in Vector Processors," by inventors Jeffry E. Gonion and Keith E. Diefendorff, filed 24 Sep. 2008.

BACKGROUND

1. Field

The described embodiments relate to techniques for improving the performance of computer systems. More specifically, the described embodiments relate to page fault prediction when processing vector instructions.

2. Related Art

Recent advances in processor design have led to the development of a number of different processor architectures. For example, processor designers have created superscalar processors that exploit instruction-level parallelism (ILP), multi-core processors that exploit thread-level parallelism (TLP), and vector processors that exploit data-level parallelism (DLP). Each of these processor architectures has unique advantages and disadvantages which have either encouraged or hampered the widespread adoption of the architecture. For example, because ILP processors can often operate on existing program code that has undergone only minor modifications, these processors have achieved widespread adoption. However, TLP and DLP processors typically require applications to be manually re-coded to gain the benefit of the parallelism that they offer, a process that requires extensive effort. Consequently, TLP and DLP processors have not gained widespread adoption for general-purpose applications.

One significant issue affecting the adoption of DLP processors is the vectorization of loops in program code. In a typical program, a large portion of execution time is spent in loops. Unfortunately, many of these loops have characteristics that render them unvectorizable in existing DLP processors. Thus, the performance benefits gained from attempting to vectorize program code can be limited.

One significant obstacle to vectorizing loops in program code in existing systems is dependencies between iterations of the loop. For example, loop-carried data dependencies and memory-address aliasing are two such dependencies. These dependencies can be identified by a compiler during the compiler's static analysis of program code, but they cannot be completely resolved until runtime data is available. Thus, because the compiler cannot conclusively determine that runtime dependencies will not be encountered, the compiler cannot vectorize the loop. Hence, because existing systems require that the compiler determine the extent of available parallelism during compilation, relatively little code can be vectorized.

SUMMARY

The described embodiments comprise a processor that handles a translation lookaside buffer (TLB) miss while executing a vector read instruction in a processor. In the described embodiments, while executing the vector read instruction, the processor performs a lookup in a TLB for addresses in active elements in the vector read instruction. The processor then determines that a TLB miss occurred while performing the TLB lookup for the address from an active element other than a first active element. Upon predicting that a page table walk for the vector read instruction will result in a page fault, the processor sets a bit in a corresponding bit position in a fault-status register (FSR) for the active element for which the TLB miss occurred. In the described embodiments, a set bit in a bit position in FSR indicates that data in a corresponding element of the vector read instruction is invalid. The processor then immediately performs memory reads for at least one of the first active element and other active elements for which TLB misses did not occur.

In this way, the processor recognizes that the vector read instruction is generally likely to encounter page faults for page table walks, and, based on this recognition, predicts that a page table walk for the particular element of the vector read instruction that encountered the TLB miss will result in a page fault. Upon making the prediction, the processor preemptively sets the bit in FSR (i.e., sets the bit in FSR before a result is known from a page table walk for the element for which the TLB miss occurred), thereby noting that the element contains invalid data. The processor then immediately proceeds with the memory read operation for the at least the first active element, and potentially all active elements for which a TLB miss did not occur, in the vector read instruction. By making this prediction and immediately proceeding with the memory read operations, the processor avoids waiting for the result from the page table walk for the element that encountered the TLB miss (and which has a chance of causing a page fault). Note that the element for which the page fault was predicted can eventually be processed as part of a subsequent re-execution of the vector read instruction, as described below.

In some embodiments, the processor sends a request for a page table walk for the element for which the TLB miss occurred, i.e., for the element for which the page fault was predicted. Upon receiving a result from the page table walk, the processor determines if the prediction that the page table walk for the vector read instruction would result in a page fault was correct. The processor then updates a record of a prediction accuracy for the vector read instruction. Updating the record comprises increasing a value of the record relative to a threshold value when the prediction is correct, and decreasing the value of the record relative to the threshold value when the prediction is incorrect.

In some embodiments, upon determining that the TLB miss occurred for the active element, the processor determines that the prediction accuracy for the vector read instruction is above the threshold value. Because the prediction accuracy is above a threshold value, the processor makes the above-described prediction that the page table walk for instruction will result in a page fault.

In some embodiments, the processor determines that a TLB lookup resulted in a TLB miss for the first active element. The processor then sends a request for a page table walk for the address in the first active element without regard as to whether page table walks for the vector read instruction are predictable as causing page faults. However, the processor does not update a record of a prediction accuracy for the vector read instruction based on a result of the page-table walk for the first active element.

In some embodiments, the processor subsequently determines elements to be processed in one or more dependent instructions based on set bit positions in FSR.

In some embodiments, when subsequently determining elements to be processed, the processor uses set bit positions in FSR to generate or modify active elements in a predicate vector read for one or more dependent instructions.

In some embodiments, the processor receives a predicate vector and uses active elements in the predicate vector to determine the active elements of the vector read instruction.

In some embodiments, the processor uses one or more factors when determining that a page table walk for the vector read instruction is predictable as causing a page fault.

In some embodiments, the processor indicates that the vector read instruction has completed when the memory reads have completed for the at least one of the first active element and other active elements for which TLB misses did not occur.

In some embodiments, the vector read instruction is the VectorReadFF instruction.

BRIEF DESCRIPTION OF THE FIGURES

In the figures, like reference numerals refer to the same figure elements.

DETAILED DESCRIPTION

Figure 1:
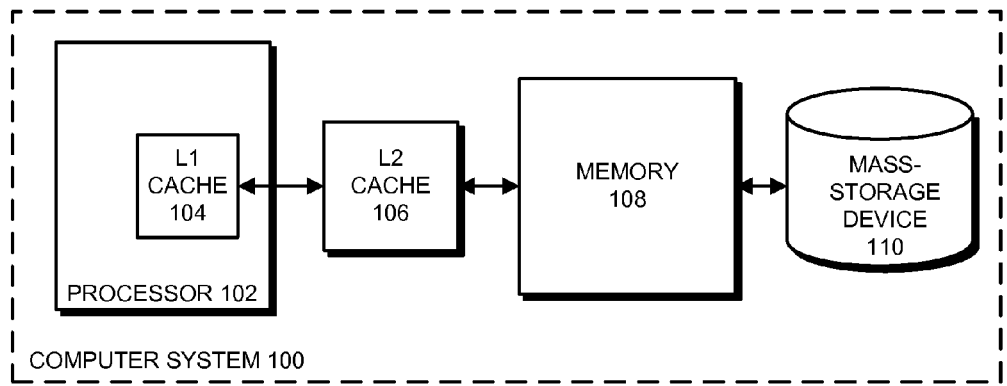
FIG. 1 presents a block diagram of a computer system in accordance with the described embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory and non-volatile memory, such as magnetic and optical storage devices such as disk drives, magnetic tape, CDs (compact discs), DVDs (digital versatile discs or digital video discs), or other media capable of storing data structures or code.

The methods and processes described in this detailed description can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules. In some embodiments, the hardware modules include one or more general-purpose circuits that are configured by executing instructions to perform the methods and processes.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Macroscalar Architecture

The embodiments described herein are based in part on the Macroscalar Architecture that is described in U.S. patent application Ser. No. 12/977,333, entitled "Generate Predicates Instruction for Processing Vectors," by inventors Jeffry E. Gonion and Keith Diefendorff, filed on 23 Dec. 2010 (hereinafter "the '333 application"), the contents of which are incorporated by reference.

As described in the '333 application, the described embodiments provide an instruction set and supporting hardware that allow compilers to generate program code for loops without completely determining parallelism at compile-time, and without discarding useful static analysis information. These embodiments provide a set of instructions that do not mandate parallelism for loops but instead enable parallelism to be exploited at runtime if dynamic conditions permit. These embodiments thus include instructions that enable code generated by the compiler to dynamically switch between non-parallel (scalar) and parallel (vector) execution for loop iterations depending on conditions at runtime by switching the amount of parallelism used.

The described embodiments provide instructions that enable an undetermined amount of vector parallelism for loop iterations but do not require that the parallelism be used at runtime. More specifically, these embodiments include a set of vector-length agnostic instructions whose effective vector length can vary depending on runtime conditions. Thus, if runtime dependencies demand non-parallel execution of the code, then execution occurs with an effective vector length of one element. Likewise, if runtime conditions permit parallel execution, the same code executes in a vector-parallel manner to whatever degree is allowed by runtime dependencies (and the vector length of the underlying hardware). For example, if two out of eight elements of the vector can safely execute in parallel, the described embodiments execute the two elements in parallel. In these embodiments, expressing program code in a vector-length agnostic format enables a broad range of vectorization opportunities that are not present in existing systems.

In the described embodiments, during compilation, a compiler first analyzes the loop structure of a given loop in program code and performs static dependency analysis. The compiler then generates program code that retains static analysis information and instructs processor 102 (see FIG. 1) how to resolve runtime dependencies and process the program code with the maximum amount of parallelism possible. More specifically, the compiler provides vector instructions for performing corresponding sets of loop iterations in parallel, and provides vector-control instructions for dynamically limiting the execution of the vector instructions to prevent data dependencies between the iterations of the loop from causing an error (which can be called "vector partitioning"). This approach defers the determination of parallelism to runtime, where the information on runtime dependencies is available, thereby allowing the software and processor to adapt parallelism to dynamically changing conditions.

TERMINOLOGY

Throughout the description, we use the following terminology. These terms may be generally known in the art, but are described below to clarify the subsequent descriptions.

The term "active element," as used in this description to refer to one or more elements of a vector, indicates elements that can be operated on during a given operation. Generally, the described embodiments enable a vector execution unit to selectively perform parallel operations on one or more available elements in a given vector in parallel. For example, an operation can be performed on only the first two of eight elements of the vector in parallel. In this case, the first two elements are "active elements," while the remaining six elements are "inactive elements." In the described embodiments, one or more other vectors can be used to determine which elements in a given operand vector are active (i.e., are to be operated on). For example, a "predicate vector" can include "active" elements that are used to determine which elements in the operand vector to perform operations on. In some embodiments, elements that contain data of a predetermined type are active elements (e.g., true, false, non-zero, zero, uppercase/lowercase characters, even/odd/prime numbers, vowels, whole numbers, etc.).

The terms "true" and "false" are used in this description to refer to data values (e.g., a data value contained in an element in a vector). Generally, in computer systems true and false are often represented by 1 and 0, respectively. In practice, a given embodiment could use any value to represent true and false, such as the number 55, or the letter "T."

In describing performing operations for vector instructions and vectors, the terms "before" and "after" may be used to describe the relative positions of elements. Generally, an element "before" another element in a vector or vector instruction has a lower vector index, e.g., element vector[0] is before element vector[1]. In vectors for which the indices for elements increase from right to left, an element is before another element when it is to the right of the element. The opposite is true when the vector indices increase from left to right. An element "after" another element in a vector or vector instruction has a higher vector index. In vectors for which the indices for elements increase from right to left, an element is after another element when it is to the left of the element. The opposite is true when the vector indices increase from left to right.

In addition, the terms "first" and "last" as applied to elements in a vector or a vector instruction for which the indices for elements increase from right to left indicate the rightmost and leftmost elements, respectively. The opposite is true when the vector indices increase from left to right.

In describing the embodiments, the term "some embodiments" is used. Generally, the term indicates that the described aspect is present in a subset of the described embodiments. However, different instances of the term "some embodiments" may describe different subsets of the possible embodiments.

Notation

In describing the embodiments, we use the following formats for variables, which are vector quantities unless otherwise noted:

p5=a<b;

Elements of vector p5 are set to 0 or 1 depending on the result of the comparison operation a<b. Note that vector p5 can be a predicate vector that can be used to control the number of elements of one or more vector instructions that execute in parallel.

~p5; a=b+c;

Only elements in vector a designated by active (i.e., non-zero) elements in the predicate vector p5 receive the result of b+c. The remaining elements of a are unchanged. This operation is called "predication," and is denoted using the tilde ("~") before the predicate vector.

!p5; a=b+c;

Only elements in vector a designated by active (i.e., non-zero) elements in the predicate vector p5 receive the result of b+c. The remaining elements of a are set to zero. This operation is called "zeroing," and is denoted using the exclamation point ("!") before the predicate vector.

if (FIRST ( )) goto . . . ; Also LAST ( ), ANY ( ), ALL ( ), CARRY ( ), ABOVE ( ), or NONE ( ), (where ANY ( )==!NONE ( ))

These instructions test the processor status flags and branch accordingly.

x+=VECLEN;

VECLEN is a value that communicates the number of elements per vector. The value is determined at runtime by the processor 102 (see FIG. 1), rather than being determined by the compiler/assembler.

// Comment

In a similar way to many common programming languages, the examples presented below use the double forward slash to indicate comments. These comments can provide information regarding the values contained in the indicated vector or explanation of operations being performed in a corresponding example.

In these examples, other C++-formatted operators retain their conventional meanings, but are applied across the vector on an element-by-element basis. Where function calls are employed, they imply a single instruction that places any value returned into a destination register. For simplicity in understanding, all vectors discussed herein are vectors of integers, but alternative embodiments support other data formats.

Instruction Definitions

The described embodiments include first-faulting and non-faulting instructions that are used for performing vector operations and handling fault conditions that may occur during the vector operations. For example, in these embodiments, vector read operations can be performed using the VectorReadFF instruction, which is a first-faulting instruction. This section provides a brief description of the VectorReadFF instructions to enable a clearer understanding of the described embodiments.

As can be seen from the definition below, in some embodiments, the VectorReadFF includes a specification of the data type upon which the instruction operates. For example, in some embodiments, the instruction is specified as VectorReadIntFF, and reads integer data. However, for clarity, in this description, the VectorReadFF instruction is described generally, i.e., with no data type specified.

Although the embodiments are described using the VectorReadFF instruction, the described embodiments are not necessarily limited to this instruction. A more detailed description of first-faulting and non-faulting instructions and their interactions with other instructions and/or processor 102 can be found in U.S. patent application Ser. No. 12/873,063, entitled "Non-Faulting and First-Faulting Instructions for Processing Vectors," by inventors Jeffry E. Gonion and Keith Diefendorff, filed on 31 Aug. 2010, the contents of which are incorporated by reference.

In addition, a dedicated instruction is not the only way to cause processor 102 to process instructions as first-faulting or non-faulting. In some embodiments, processor 102 can include one or more mechanisms (configuration registers, switches, variables, etc.) for configuring processor 102 to process vector instructions as first-faulting or non-faulting, regardless of the manner in which the instructions would be processed normally. These instructions may be handled similarly to the VectorReadFF instruction described herein. For example, in some embodiments, a normal (i.e., all-faulting) vector read instruction can be handled as a first-faulting read instruction when processor 102 is so configured.

Note that the format of the following instruction definition is a statement of the instruction type followed by a description of the instruction.

VectorReadFF

This instruction reads a vector of data from a vector of addresses calculated from its inputs. Only the first active element can generate a memory fault or exception. A vector of offsets in offset are scaled by 1, 2, 4, or 8, according to type, and added to the scalar address specified in ptr. Data is returned in the destination register. When a predicate vector is received (and not, therefore, assumed), only addresses corresponding to active elements are read.

This instruction only causes a page fault if the first active address is illegal or otherwise unmapped. If a faulting condition occurs in positions subsequent to the first active element, no exception is generated and corresponding bits in fault status register (FSR) 400 (see FIG. 4) are set (note that the prediction in the described embodiments can change this behavior, as described below).

The interface for this instruction is:

Vector VectorRead<type>FF(void *ptr, Vector offset);

Computer System

FIG. 1 presents a block diagram of a computer system 100 in accordance with the described embodiments. Computer system 100 includes processor 102, L2 cache 106, memory 108, and mass-storage device 110. Processor 102 includes L1 cache 104.

Processor 102 can be a general-purpose processor that performs computational operations. For example, processor 102 can be a central processing unit (CPU) such as a microprocessor, a controller, an application-specific integrated circuit (ASIC), or a field-programmable gate array (FPGA). In the described embodiments, processor 102 has one or more mechanisms for vector processing (i.e., vector execution units).

Mass-storage device 110, memory 108, L2 cache 106, and L1 cache 104 are computer-readable storage devices that collectively form a memory hierarchy that stores data and instructions for processor 102. Generally, mass-storage device 110 is a high-capacity, non-volatile memory, such as a disk drive or a large flash memory, with a large access time, while L1 cache 104, L2 cache 106, and memory 108 are smaller, faster semiconductor memories that store copies of frequently used data. Memory 108 is typically a dynamic random access memory (DRAM) structure that is larger than L1 cache 104 and L2 cache 106, whereas L1 cache 104 and L2 cache 106 are typically comprised of smaller static random access memories (SRAM). In some embodiments, L2 cache 106, memory 108, and mass-storage device 110 are shared between one or more processors in computer system 100. Such memory structures are well-known in the art and are therefore not described in more detail.

Computer system 100 can be (or can be incorporated into) many different types of electronic devices. For example, computer system 100 can be part of a desktop computer, a laptop computer, a tablet computer, a server, a media player, an appliance, a cellular phone, a piece of testing equipment, a network appliance, a personal digital assistant (PDA), a hybrid device (i.e., a "smart phone"), or another electronic device.

Although we use specific components to describe computer system 100, in alternative embodiments, different numbers and/or types of components may be present in computer system 100. For example, computer system 100 may not include some of the memory hierarchy (e.g., memory 108 and/or mass-storage device 110). Computer system 100 may also include one or more additional processors, wherein the processors share some or all of L2 cache 106, memory 108, and mass-storage device 110. Additionally, computer system 100 may include other subsystems (not shown) such as display subsystems, audio subsystems, networking subsystems, I/O subsystems, and/or other components.

Processor

Figure 2:
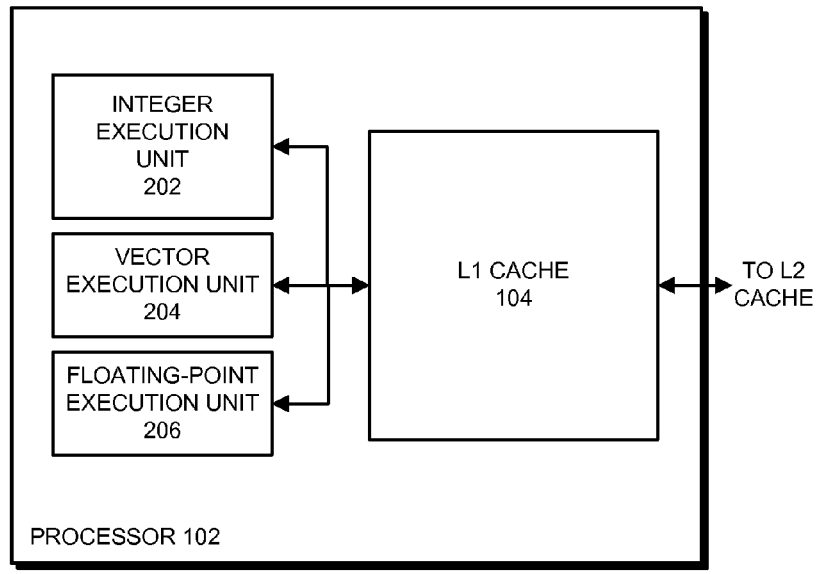
FIG. 2 presents a block diagram of a processor in accordance with the described embodiments.

FIG. 2 presents a block diagram of processor 102 in accordance with the described embodiments. As is shown in FIG. 2, processor 102 includes L1 cache 104, integer execution unit 202, vector execution unit 204, and floating-point execution unit 206 (integer execution unit 202, vector execution unit 204, and floating-point execution unit 206 as a group are herein referred to as "the execution units").

Each of execution units 202-206 is used for performing computational operations, such as logical operations, mathematical operations, or bitwise operations for an associated type of operand. More specifically, integer execution unit 202 is used for performing computational operations that involve integer operands, floating-point execution unit 206 is used for performing computational operations that involve floating-point operands, and vector execution unit 204 is used for performing computational operations that involve vector operands. Integer execution units and floating-point execution units are generally known in the art and are not described in more detail.

Figure 3:
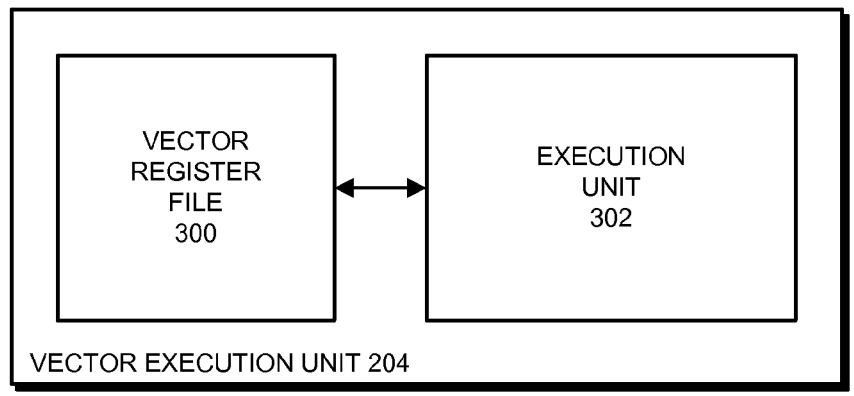
FIG. 3 presents a block diagram of a vector execution unit in accordance with the described embodiments.

In the described embodiments, vector execution unit 204 is a single-instruction-multiple-data (SIMD) execution unit that performs operations in parallel on some or all of the data elements that are included in vectors of operands. FIG. 3 presents a block diagram of vector execution unit 204 in accordance with the described embodiments. As is shown in FIG. 3, vector execution unit 204 includes a vector register file 300 and an execution unit 302. Vector register file 300 includes a set of vector registers that can hold operand vectors and result vectors for execution unit 302. In some embodiments, there are 32 vector registers in the vector register file, and each register includes 128 bits. In alternative embodiments, there are different numbers of vector registers and/or different numbers of bits per register.

Execution unit 302 retrieves operands from registers in vector register file 300 and executes vector instructions that cause execution unit 302 to perform operations in parallel on some or all of the data elements (or, simply, "elements") in the operand vector. For example, execution unit 302 can perform logical operations, mathematical operations, or bitwise operations on the elements in the vector. Execution unit 302 can perform one vector operation per cycle (although the "cycle" may include more than one cycle of a clock used to trigger, synchronize, and/or control execution unit 302's computational operations).

In the described embodiments, execution unit 302 supports vectors that hold N data elements (e.g., bytes, words, double-words, etc.). In these embodiments, execution unit 302 can perform operations on Nor fewer of the data elements in an operand vector in parallel. For example, assuming an embodiment where the vector is 256 bits in length (i.e., 32 bytes), the data elements being operated on are four-byte words, and the operation is adding a value to the data elements, these embodiments can add the value to any number of the eight words in the vector.

In the described embodiments, execution unit 302 includes at least one control signal that enables the dynamic limitation of the data elements in an operand vector on which execution unit 302 operates. Specifically, depending on the state of the control signal, execution unit 302 may or may not operate on all the data elements in the vector. For example, assuming an embodiment where the vector is 512 bits in length and the data elements being operated on are four-byte words, the control signal can be asserted to prevent operations from being performed on some or all of 16 data words in the operand vector. Note that "dynamically" limiting the data elements in the operand vector upon which operations are performed can involve asserting the control signal separately for each cycle at runtime.

In some embodiments, based on the values contained in a vector of predicates or one or more scalar predicates, execution unit 302 applies vector operations to selected vector data elements only. In some embodiments, the remaining data elements in a result vector remain unaffected (which we call "predication") or are forced to zero (which we call "zeroing"). In some of these embodiments, the clocks for the data element processing subsystems ("lanes") that are unused due to predication or zeroing in execution unit 302 can be gated, thereby reducing dynamic power consumption in execution unit 302.

The described embodiments are vector-length agnostic. Thus, a compiler or programmer need not have explicit knowledge of the vector length supported by the underlying hardware (e.g., vector execution unit 302). In these embodiments, a compiler generates or a programmer writes program code that need not rely on (or use) a specific vector length (some embodiments are forbidden from even specifying a specific vector size in program code). Thus, the compiled code in these embodiments (i.e., binary code) runs on other embodiments with differing vector lengths, while potentially realizing performance gains from processors that support longer vectors. Consequently, as process technology allows longer vectors, execution of legacy binary code simply speeds up without any effort by software developers.

In some embodiments, vector lengths need not be powers of two. Specifically, vectors of 3, 7, or another number of data elements can be used in the same way as vectors with power-of-two numbers of data elements.

In the described embodiments, each data element in the vector can contain an address, and the addresses from the elements can be used by execution unit 302 for performing a set of memory accesses in parallel. If one or more elements of the vector contain invalid memory addresses, invalid memory-read operations can occur. In these embodiments, invalid memory-read operations that would otherwise result in program termination instead cause any elements with valid addresses to be read and elements with invalid addresses to be flagged (e.g., using FSR 400 as described in FIG. 4), allowing program execution to continue in the face of speculative, and in hindsight illegal, read operations.

In some embodiments, processor 102 (and hence execution unit 302) is able to operate on and use vectors of pointers. In these embodiments, the number of data elements per vector is the same as the number of pointers per vector, regardless of the size of the data type. Instructions that operate on memory may have variants that indicate the size of the memory access, but elements in processor registers should be the same as the pointer size. In these embodiments, processors that support both 32-bit and 64-bit addressing modes may choose to allow twice as many elements per vector in 32-bit mode, thereby achieving greater throughput. This implies a distinct throughput advantage to 32-bit addressing, assuming the same width data path. Implementation-specific techniques can be used to relax the requirement. For example, double-precision floating-point numbers can be supported in 32-bit mode through register pairing or some other specialized mechanism.

In the described embodiments, processor 102 includes a translation lookaside buffer (TLB) (not shown). The TLB is used for performing translations from virtual addresses (i.e., the addresses used by program code that is executed in processor 102) to physical addresses (i.e., the actual memory addresses). The TLB is a small memory/cache that includes a number of entries for storing virtual-address-to-physical-address translations and a lookup mechanism. During operation, when processor 102 needs to translate a virtual address to a physical address, processor 102 sends a request to the TLB, which checks the entries to determine if the translation is held in one of the entries. If so, the TLB returns the physical address, which is called a TLB hit. Otherwise, the TLB returns a miss. As described below, when a miss occurs, processor 102 can perform a page table walk to find the translation and can then cache the found translation in the TLB.

Figure 4:
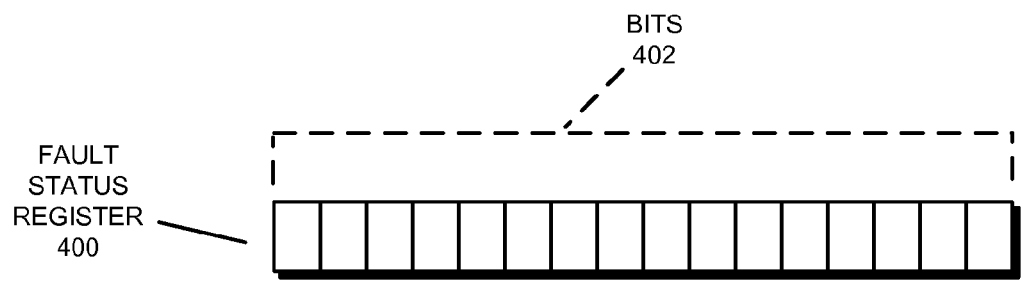
FIG. 4 presents a block diagram of a fault status register in accordance with the described embodiments.

The described embodiments include a fault status register (FSR) in processor 102. FIG. 4 presents a block diagram of a fault status register (FSR) 400 in accordance with the described embodiments. FSR 400 comprises a memory (e.g., a register or another memory) that can be used by processor 102 for tracking vector instruction elements where faults occurred while executing a vector instruction. FSR 400 comprises a bit 402 for each element in the vector instructions that that can cause faults. A set bit 402 in FSR 400 indicates that a fault (or a predicted fault) for a corresponding element for at least one vector instruction was ignored and hence data in the element of the vector instruction is invalid. Note that although we describe FSR 400 using certain components, other and/or different components may be present. For example, FSR 400 can include a different number of bits 402.

In the described embodiments, processor 102 can generally use FSR 400 as follows: (1) execute a vector instruction that allows faults to be ignored for given elements (e.g., all elements, elements other than the first element, etc.); (2) detect that an ignorable fault has occurred in a vector element; (3) set a corresponding bit 402 in FSR 400 to indicate that a fault was ignored; and (4) ignore the fault and proceed with executing the vector instruction. In this way, processor 102 can complete execution for the vector elements that do not encounter a fault, and can (possibly) deal with the fault later.

In dealing with the fault later, processor 102 can set active elements in subsequent instructions based on the set bit 402 in FSR 400, can re-perform some or all of the operations for the vector instruction for the element that encountered the fault (and/or one or more other elements in the vector instruction), and/or can perform other operations to handle the fault.

Although FSR 400 can be used as described above, the described embodiments can also use FSR 400 in making predictions of page faults for vector read instructions. More specifically, the described embodiments can determine that a TLB miss occurred for at least one active element in a vector read instruction, and can then predict that a page table walk for the vector read instruction will result in a page fault. Upon predicting the page fault, these embodiments can set at least one corresponding bit 402 in FSR 400 for the element in the vector read instruction, and can proceed with execution of the vector read instruction as described below. In this way, the described embodiments use FSR 400 to assist in handling a predicted page fault.

Figure 5:
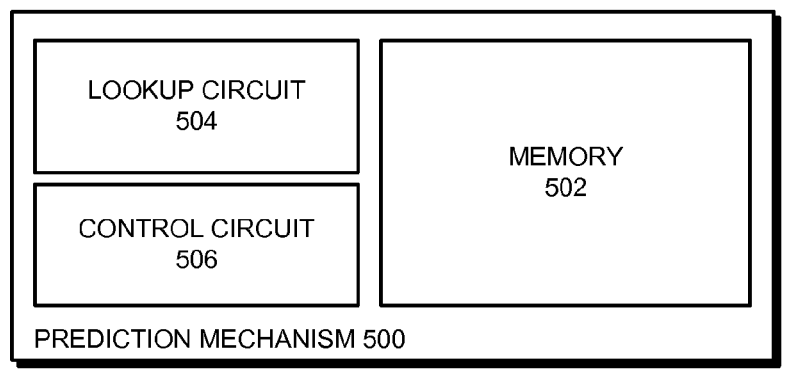
FIG. 5 presents a block diagram of a prediction mechanism in accordance with the described embodiments.

The described embodiments also include a prediction mechanism in processor 102. FIG. 5 presents a block diagram illustrating prediction mechanism 500 in accordance with the described embodiments. Note that although prediction mechanism 500 is shown separately, some or all of prediction mechanism 500 can be included in another component or unit in processor 102. For example, in some embodiments, prediction mechanism 500 is located in vector execution unit 206.

Prediction mechanism 500 includes one or more circuits for making a prediction whether page table walks for vector instructions will cause page faults. For example, prediction mechanism 500 can comprise a memory 502 with a set of entries that can each be used for keeping a record about one or more vector read instructions. The record in each entry in memory 502 can include: information for identifying the vector read instruction(s) to which the record is related; a prediction accuracy value; a prediction; and/or a set of valid/control bits. The information for identifying the vector read instruction in an entry can comprise information such as a program counter of the vector read instruction, a location of the vector read instruction relative to some other location in the program code and/or program counter, an opcode of the vector read instruction, an indication of the region or regions of memory read by the vector read instruction, or other information that can be used to identify the vector read instruction.

Prediction mechanism 500 can also comprise a lookup circuit 504 for determining if any of the entries in memory 502 include a record for a given vector read instruction, and for determining if the prediction accuracy in the record is above a threshold value (in embodiments where a prediction accuracy is maintained by prediction mechanism 500). Prediction mechanism 500 can further comprise a control circuit 506 for managing the entries, controlling the operation of prediction mechanism 500, etc. Note that although we describe prediction mechanism 500 using certain components, other and/or different components may be present and/or the given components may perform more or different operations.

In the described embodiments, the prediction value in each record in memory 502 can be based on one or more factors. Generally, any factor that can be used to predict, characterize, or estimate the likely result of a page table walk for a vector read instruction can be used in setting the prediction value, including a history of instruction execution (i.e., the vector read instruction itself and/or other instructions), the past or current state of processor 102, the page-table, other page-table page-walks, and/or other such factors. As examples, the record in memory 502 can include a prediction value based on one or more of the following factors: (1) a page table walk for the vector read instruction caused a page fault one or more previous times that a page table walk was performed; (2) a table lookup computed from an address of the vector read instruction returns a confirmation that that a page table walk for the vector read instruction is likely to cause a page fault; (3) one or more processor tracking mechanisms are set to indicate that a page table walk for the vector read instruction is likely to cause a page fault; (4) a computation made by a prediction computation mechanism (e.g., a fuzzy logic, processor, neural network, etc.) in prediction mechanism 500 indicates that a page table walk for the vector read instruction is likely to cause a page fault; (5) the addresses of one or more prior instructions of a given type that preceded the vector read instruction indicate that a page table walk for the vector read instruction is likely to cause a page fault; (6) one or more factors related to executing instructions prior to the vector read instruction (a code-path history) indicate that a page table walk for the vector read instruction is likely to cause a page fault; (7) a pattern of taken or not-taken branches for a number of branches that preceded the vector read instruction that is being predicted indicates that a page table walk for the vector read instruction is likely to cause a page fault; or (8) a value of counter indicating the number of occurrences of an event (e.g., a prior prediction) indicates that a page table walk for the vector read instruction is likely to cause a page fault. In these embodiments, prediction mechanism can store a value that represents each factor to be used in making a decision and then can perform one or more mathematical, logical, combinatory, comparison, or algorithmic operations using the values to make the determination.

In the described embodiments, prediction mechanism 500 can include one or more variables, memory locations, registers, lookup tables, status flags/indicators, functional blocks, or other mechanisms or circuit structures that are used to hold values representing the factors to enable prediction mechanism to determine that page table walk for vector read instructions are likely to cause page faults. Prediction mechanism 500 can use these mechanisms to maintain records of the one or more factors that are used in making the determination. Prediction mechanism 500 and/or processor 102 can additionally compute values to be used by prediction mechanism for making the determination. These values can be computed at the time that the determination is to be made or can be automatically computed whenever a relevant event occurs and stored in a one or more records in memory 502 (or elsewhere in prediction mechanism 500).

In these embodiments, when processor 102 encounters a TLB miss for a given active element in a vector read instruction, processor 102 causes (by asserting a signal, sending a request or interrupt, etc.) prediction mechanism 500 to predict whether a page table walk for the vector read instruction is likely to cause a page fault. If so, processor 102 can set a corresponding bit 402 in FSR 400 and can continue processing other active elements for which a page fault did not occur. Note that the corresponding bit 402 is set in FSR 400 and the processing for other active elements is performed based on a prediction, it is not therefore necessary in these embodiments to receive an indication that an actual page fault has occurred before setting the corresponding bit 402 in FSR 400. The prediction of page faults is described in more detail below.

In some embodiments, prediction mechanism 500 includes a mechanism for tracking prediction accuracy for vector read instructions. In these embodiments, the prediction accuracy can be kept in a record for the vector read instruction in memory 502 as a value that represents a portion of the predictions that turned out to be correct and/or incorrect. For example, the prediction accuracy can be kept as a percentage of all the predictions made that proved to be correct. The prediction accuracy can be used as one of the factors in determining whether the result of a page table walk for a vector read instruction can be predicted. For example, if the prediction accuracy is below a threshold value (e.g., X % correct, last M predictions correct, etc.), prediction mechanism 500 may not make the prediction (or may only make the prediction if one or more of the other factors strongly indicates that the result of a page table walk for the vector read instruction is predictable).

Although we describe processor 102 as including a particular set of units, in alternative embodiments, processor 102 can include different numbers or types of units. Moreover, although the embodiment shown in FIG. 2 is limited to a particular set of functional blocks, in the described embodiments, processor 102 can include other functional blocks, such as an instruction fetch unit, a branch unit, a memory management unit, I/O interfaces, etc. coupled to the execution units. The additional functional blocks that can be present in processor 102 are known in the art and are not described in more detail.

Prediction of Pane Faults

Generally, in Macroscalar processors, i.e., in processors based on the Macroscalar architecture, iterations of loops can be executed in parallel using corresponding elements of a vector instruction. Thus, loop operations, such as arithmetic operations, bitwise operations, logical operations, and memory operations, can be performed in parallel by executing a vector instruction that uses a vector of loop values as inputs, with each element of the input vector corresponding to a given loop iteration. For example, for memory read operations in a loop, an address for each iteration of the loop can be written into a corresponding element of an input vector and a vector read instruction (e.g., a VectorReadFF instruction) can read from the address in each active element of the input vector in parallel.

As part of executing a vector read instruction, the described embodiments perform a lookup in the translation lookaside buffer (TLB) to retrieve physical addresses for virtual addresses for active elements of the vector instruction. This generally involves performing a TLB lookup for an address from at least one, but as many as all, of the active elements of the vector instruction. The physical addresses are then used to perform the memory read operation.

However, the TLB is limited in size, and therefore only holds a limited number of virtual-to-physical address translations. If a physical address translation for a given virtual address is not present in the TLB, the lookup "misses" in the TLB, and processor 102 proceeds with a page table walk to retrieve the virtual-to-physical address translation for each element for which the lookup missed in the TLB. During the page table walk, processor 102 walks (reads) page tables in memory to determine if the virtual-to-physical translation for the address can be found in a page in the page tables. If so, processor 102 writes the translation to an entry in the TLB and uses the translation to proceed with the read operation for the corresponding element. Otherwise, if the virtual-to-physical translation is not found for a given element, processor 102 generates a page fault and loads a corresponding page from memory to the page tables. Processor 102 then proceeds as described above using the newly-loaded translation. (Note that this description of TLB lookups, page table walks, and page faults is simplified for clarity. Those of skill in the art will recognize that different implementations use various mechanisms (an operating system, memory management hardware, etc.) and techniques for performing virtual-to-physical translations for addresses.)

Because loading a page from memory and resolving a physical address from the loaded page takes a relatively long time (potentially several hundred times longer, for example, than a hit in the TLB), a corresponding read operation for the vector read instruction can be held up for a long time waiting for the translation. Because all of the read operations for a vector read instruction must complete before the vector read instruction itself can complete, subsequent dependent instructions can be delayed for a long time before beginning execution when an element of the read instruction causes a page fault.

However, the described embodiments avoid some of the delay associated with awaiting the results for page table walks for vector read instructions by predicting the results for page table walks. In these embodiments, elements of vector read instructions for which page table walks are predicted to result in page faults are prevented from delaying the read operations for earlier active elements in vector read instructions.

This is achieved by detecting that a TLB lookup for an active element (other than the first active element) in a vector read instruction has resulted in a TLB miss; causing prediction mechanism 500 to look up a record for the vector read instruction that indicates whether page table walks for the vector read instruction can be predicted as causing page faults; and, if so, setting a corresponding bit 402 in FSR 400 that indicates that the data in the active element for which the TLB miss occurred is invalid. Then, upon setting the corresponding bit 402 in FSR 400, immediately proceeding with read operations for active elements in the vector instruction for which a TLB miss was not encountered. In this way, the reads for active elements in the vector instruction for which a TLB miss was not encountered can proceed immediately, instead of awaiting a result of the page table walk for the element for which the TLB miss occurred, thereby enabling dependent instructions to use the data read from memory by the vector read instruction sooner (and hence improving the performance of processor 102).

Note that, in the described embodiments, page faults are generally not avoided. Instead, elements that are predicted to cause page table faults are prevented from delaying the read operations for other active elements in the vector read instruction for which TLB misses did not occur. In some embodiments, a subsequent instruction executed by processor 102 detects the bit that was set in FSR 400 upon making the prediction and causes processor 102 to re-execute the vector read instruction so that the read operation for the element that was predicted as causing the page fault (including the TLB lookup) is again attempted. Upon re-execution, the element may or may not encounter the predicted page fault (and may not even require a page table walk, as an earlier page table walk may have written the translation into the TLB).

In the described embodiments, if the element is the first/rightmost element in the vector read instruction, processor 102 sends the page table walk upon detecting the miss in the TLB, regardless as to whether the vector read instruction can be predicted as causing a page fault. In this way, at least one read operation for the vector read instruction will always be performed, thereby enabling forward progress to be made. Because the first element is handled this way, the read operation for every element of the vector instruction can eventually be performed—which can mean that a page fault eventually results from a page table walk for the instruction.

Predicting a Page Fault while Executing a VectorReadFF Instruction

Figure 6:
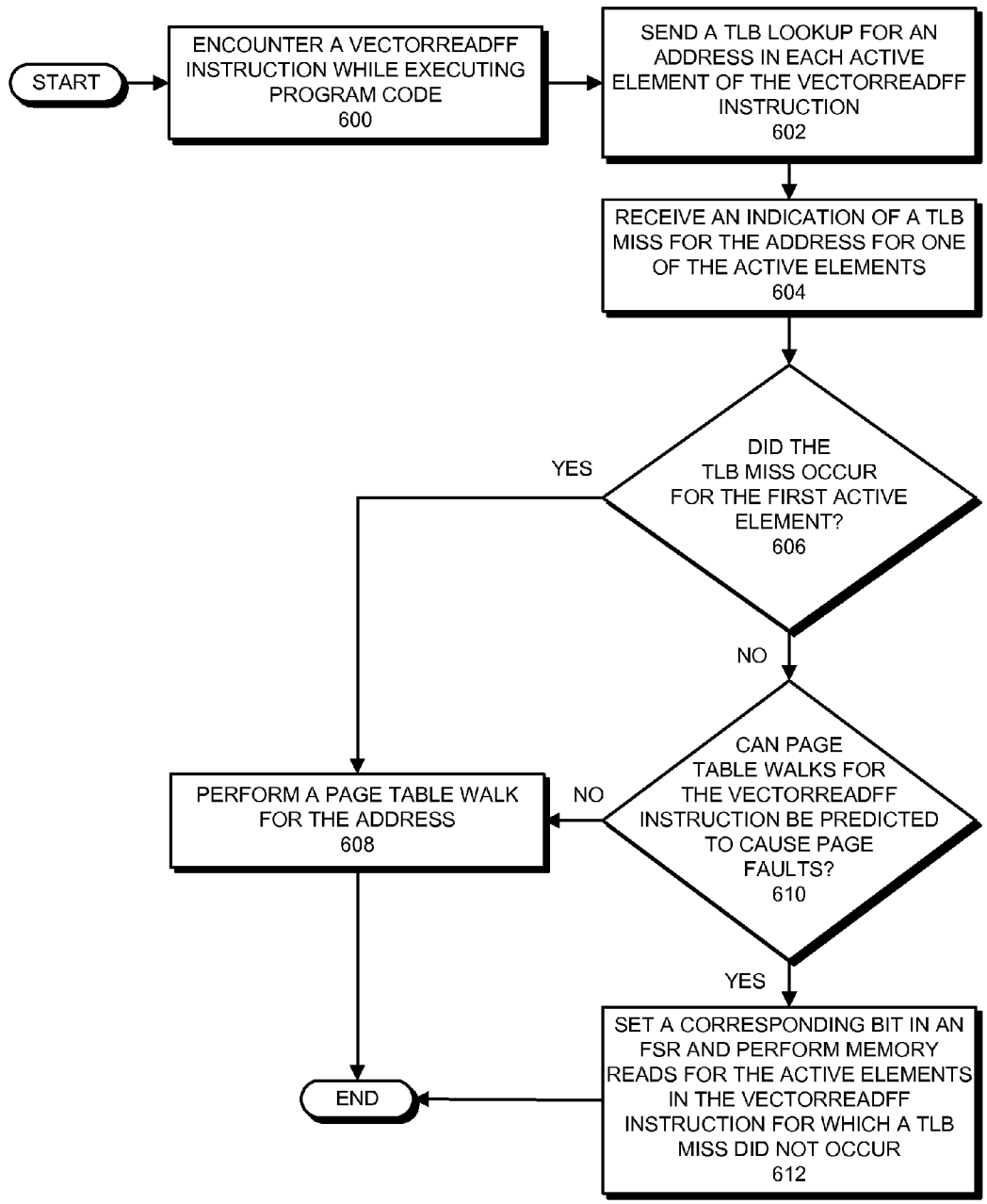
FIG. 6 presents a flowchart illustrating a process for predicting a page fault for a VectorReadFF instruction in accordance with the described embodiments.

FIG. 6 presents a flowchart illustrating a process for predicting a page fault for a VectorReadFF instruction in accordance with the described embodiments. Note that the VectorReadFF instruction is used as an example, the described embodiments function in a similar way with other vector read instructions.

The process shown in FIG. 6 starts when processor 102 encounters a VectorReadFF instruction while executing program code (step 600). For this example, it is assumed that the instruction encountered by processor 102 is formatted as follows: ~p5; VectorReadFF(v_input); where all of the elements of the predicate vector p5 are active. Because all of the elements of predicate vector p5 are active, all of the elements of the VectorReadFF instruction are active, and are therefore all processed in parallel when executing the VectorReadFF instruction. Although this is used as an example case, in some cases, less than all of the elements of the predicate vector are active, and hence less than all of the elements of the VectorReadFF instruction are processed in parallel. However, the processing for the elements that are active proceeds as described below.

Processor 102 then sends a TLB lookup for an address in each element of the VectorReadFF instruction (step 602). Recall that sending the TLB lookup comprises requesting a physical address for the virtual address in each element of the VectorReadFF instruction from a TLB. If the virtual-address-to-physical-address translation is available in the TLB, the TLB returns the physical address, which is called a TLB hit. Otherwise, the TLB returns an indication of a TLB miss.

Note that, in some cases, processor 102 does not perform the TLB lookup for every active element in the VectorReadFF instruction. For example, processor 102 can recognize that a TLB lookup only needs to be performed for a single representative active element from the VectorReadFF instruction, and the physical addresses in the rest of the active elements can be determined using the physical address for the representative active element.

Processor 102 then receives an indication of a TLB miss for the address for one of the active elements (step 604). Note that one TLB miss is just an example, as many as all of the TLB lookups could return TLB misses, and the TLB misses would be handled as described below. Recall that, upon encountering a TLB miss for a given virtual address, processor 102 can perform a page table walk to retrieve the virtual-address-to-physical-address translation for the virtual address from page tables stored in memory 108 in computer system 100.

Processor 102 next determines if the TLB miss occurred for the first active element in the VectorReadFF instruction (step 606). If so, processor 102 does not make the prediction described below, but instead simply performs a page table walk for the address (step 608). Note processor 102 performs the page table walk without regard as to the prediction that prediction mechanism 500 would make for the VectorReadFF instruction.

When the TLB miss occurred for an active element in the VectorReadFF instruction other than the first active element, processor 102 determines if page table walks for the VectorReadFF instruction can be predicted to cause page faults (step 610). In the some embodiments, to make the determination, processor 102 causes prediction mechanism 500 to perform a lookup for the VectorReadFF instruction in a memory 502 to determine if there is a record of the VectorReadFF instruction that can be used to make the prediction. If there is no record, the prediction cannot be made and prediction mechanism 500 predicts that no page fault will occur as a result of the page table walk. When no page fault is predicted, processor 102 performs a page table walk for the address (step 608).

In some embodiments, when making the determination whether to predict that a page table walk for the VectorReadFF instruction is likely to cause a page fault, prediction mechanism can determine that a page table walk for any/all VectorReadFF instructions are likely to cause a page fault. In some embodiments, the prediction can be made without considering any of the above-described factors, i.e., can be automatic/default. In some embodiments, this is the initial prediction that is made for each VectorReadFF instruction, until a history of executing the VectorReadFF instruction can be determined. For example, such a prediction can be made for VectorReadFF instructions for which there is no record in memory 502.

Otherwise, if there is a record, prediction mechanism 500 checks the record to determine if the record indicates that a prediction can be made. For example, prediction mechanism 500 can determine a prediction value ("page fault"/"no page fault") and possibly a prediction accuracy from the record. If the record predicts no page fault; if the record predicts a page fault, but the prediction accuracy is below a threshold value (in embodiments that maintain and check a prediction accuracy); or if something about the record indicates that the record cannot be trusted (e.g., a valid bit in the record is unset, the record is too old, the information in the record appears to be corrupted, etc.), prediction mechanism 500 predicts that no page fault will occur as a result of the page table walk. When no page fault is predicted, processor 102 performs a page table walk for the address (step 608).

If the prediction value in the record in memory 502 for the VectorReadFF instruction indicates that a page fault is predicted and the prediction accuracy is above a threshold value (in embodiments that maintain and check a prediction accuracy), prediction mechanism 500 predicts that a page table walk for the VectorReadFF instruction will cause a page fault. Processor 102 then sets a corresponding bit 402 in FSR 400 and immediately proceeds to perform memory reads for the active elements in the VectorReadFF instruction for which a TLB miss did not occur (step 612). As described above, setting the bit 402 in the FSR 400 indicates to processor 102 (and hence to subsequent instructions) that the data in the corresponding element of the VectorReadFF instruction is invalid. In some embodiments, processor 102 does not perform a read operation for the element for which the TLB miss occurred.

In some embodiments, when performing the reads for the active elements in the VectorReadFF instruction for which a TLB miss did not occur, processor 102 can perform reads only for the elements in the VectorReadFF instruction before the element for which the TLB miss occurred. In alternative embodiments, processor 102 can perform reads for all the active elements in the VectorReadFF instruction for which a TLB miss did not occur, regardless of position relative to the element for which the TLB miss occurred.

In some embodiments, when setting the bit 402 in the FSR 400 for the element for which the TLB miss occurred, processor 102 also sets the bit 402 for any active elements after the element for which the TLB miss occurred. This enables processor 102 to invalidate the data for the element for which the TLB miss occurred and all elements after that element in the VectorReadFF instruction.

Processor 102 can then indicate the VectorReadFF instruction has completed when the memory reads have completed for the active elements for which TLB misses did not occur.

In the described embodiments, processor 102 subsequently determines elements to be processed in one or more dependent instructions based on set bits 402 in FSR 400. More specifically, processor 102 can determine that elements of a dependent instruction for which a bit 402 is set are not to be processed, are to be processed using special handling, etc., whereas elements of the dependent instruction for which a bit 402 in FSR 400 is set are to be processed normally (i.e., the normal operations of the dependent instruction are to be performed on the element). In some embodiments, processor uses set bits 402 in FSR 400 to generate or modify active elements in a predicate vector that is used when executing one or more dependent instructions.

Updating a Prediction Record

In some embodiments, as part of the process shown in FIG. 6, processor 102 also sends a request for a page table walk for the element for which the TLB miss occurred. More specifically, despite having set the bit 402 in FSR 400 for the element (thereby invalidating the data in the element) and immediately proceeded to perform memory reads for the active elements in the VectorReadFF instruction for which a TLB miss did not occur, processor 102 also sends the page table walk for the element for which the TLB miss occurred. Although the read operation for the element for the element for which the TLB miss occurred is not performed, processor 102 sends the page table walk to resolve the TLB miss and to determine if the prediction was correct. Upon receiving a result from the page table walk (i.e., either a returned translation, indicating success, or a page fault, indicating failure), processor 102 determines if the prediction that the page table walk for the VectorReadFF instruction would result in a page fault was correct.

If the page table walk was successful, and hence the prediction of a page fault was incorrect, processor 102 updates a record in memory 502 for the VectorReadFF instruction. In some embodiments, this simply means changing the prediction value in the record to reflect "no page fault." However, in other embodiments, processor 102 can decrease a value of the prediction accuracy in the record relative to a threshold value when the prediction is incorrect. This can enable processor 102 to use more than one result to determine a prediction. The number of results that processor 102 is configured to use to determine the value of the prediction accuracy can be set by setting the increment of the adjustment accordingly. For example, if three consecutive missed predictions should change the prediction value, the adjustment steps can be set accordingly. Processor 102 can also update the TLB with the returned translation when the page table walk was successful.

If the page table walk caused a page fault, and hence the prediction of a page fault was correct, processor 102 leaves unchanged a record of a prediction accuracy for the VectorReadFF instruction (because the record already indicated "page fault"). However, in other embodiments, processor 102 can increase a value of the prediction accuracy in the record relative to a threshold value when the prediction is correct.

In some embodiments, the results of page table walks sent at any time can be used to update the prediction value and/or prediction accuracy in a corresponding record (i.e., page table walk results for "normal" page table walks, etc.). However, in some embodiments, the page table walk sent for a first active element in a VectorReadFF instruction is not used to update the prediction value and/or the prediction accuracy.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art.

Additionally, the above disclosure is not intended to limit the embodiments. The scope of the embodiments is defined by the appended claims.

What is claimed is:

1. A method for handling a translation lookaside buffer (TLB) miss while executing a vector read instruction in a processor, comprising:
    while executing the vector read instruction, performing a lookup in a TLB for addresses in active elements in the vector read instruction;
    determining that a TLB miss occurred while performing the TLB lookup for the address from an active element other than a first active element;
    upon predicting that a page table walk for the vector read instruction will result in a page fault, setting a bit in a corresponding bit position in a fault-status register (FSR) for the active element for which the TLB miss occurred, wherein a set bit in a bit position in the FSR indicates that data in a corresponding element of the vector read instruction is invalid; and
    performing memory reads for at least one of the first active element and other active elements for which TLB misses did not occur.

2. The method of claim 1, further comprising:
    sending a request for a page table walk for the element for which the TLB miss occurred;
    upon receiving a result from the page table walk, determining if the prediction that the page table walk for the vector read instruction would result in a page fault was correct; and
    updating a record of a prediction accuracy for the vector read instruction, wherein updating the record comprises increasing a value of the record relative to a threshold value when the prediction is correct, and decreasing the value of the record relative to the threshold value when the prediction is incorrect.

3. The method of claim 2, further comprising:
    upon determining that the TLB miss occurred for the active element, determining that the prediction accuracy for the vector read instruction is above the threshold value; and
    responsive to determining that the prediction accuracy is above a threshold value, predicting that the page table walk for instruction will result in a page fault.

4. The method of claim 1, further comprising:
    determining that a TLB lookup resulted in a TLB miss for the first active element;
    sending a request for a page table walk for the address in the first active element without regard as to whether page table walks for the vector read instruction are predictable as causing page faults; and
    not updating a record of a prediction accuracy for the vector read instruction based on a result of the page-table walk for the first active element.

5. The method of claim 1, further comprising:
    determining elements to be processed in one or more dependent instructions based on set bit positions in the FSR.

6. The method of claim 5, wherein determining elements to be processed comprises:
    using set bit positions in the FSR to generate or modify active elements in a predicate vector read for one or more dependent instructions.

7. The method of claim 1, further comprising:
    receiving a predicate vector; and
    using active elements in the predicate vector to determine the active elements of the vector read instruction.

8. The method of claim 1, wherein determining that a page table walk for the vector read instruction is predictable as causing a page fault comprises using one or more factors in making the determination.

9. The method of claim 1, further comprising:
    indicating the vector read instruction has completed when the memory reads have completed for the at least one of the first active element and other active elements for which TLB misses did not occur.

10. The method of claim 1, wherein the vector read instruction is a VectorReadFF instruction.

11. A processor that handles a TLB miss while executing a vector read instruction, comprising:
    an execution unit in the processor, wherein the execution unit is configured to:
        while executing the vector read instruction, perform a lookup in a TLB for addresses in active elements in the vector read instruction;
        determine that a TLB miss occurred while performing the TLB lookup for the address from an active element other than a first active element;
        upon predicting that a page table walk for the vector read instruction will result in a page fault, set a bit in a corresponding bit position in an FSR for the active element for which the TLB miss occurred, wherein a set bit in a bit position in the FSR indicates that data in a corresponding element of the vector read instruction is invalid; and
        perform memory reads for at least one of the first active element and other active elements for which TLB misses did not occur.

12. The processor of claim 11, wherein the execution mechanism is further configured to:
    send a request for a page table walk for the element for which the TLB miss occurred;
    upon receiving a result from the page table walk, determine if the prediction that the page table walk for the vector read instruction would result in a page fault was correct; and
    update a record of a prediction accuracy for the vector read instruction, wherein updating the record comprises increasing a value of the record relative to a threshold value when the prediction is correct, and decreasing the value of the record relative to the threshold value when the prediction is incorrect.

13. The processor of claim 12, wherein, upon determining that the TLB miss occurred for the active element, the execution unit is configured to determine that the prediction accuracy for the vector read instruction is above the threshold value; and
    responsive to determining that the prediction accuracy is above a threshold value, the execution unit is configured to predict that the page table walk for instruction will result in a page fault.

14. The processor of claim 11, wherein the execution unit is configured to:
    determine that a TLB lookup resulted in a TLB miss for the first active element;
    send a request for a page table walk for the address in the first active element without regard as to whether page table walks for the vector read instruction are predictable as causing page faults; and
    not update a record of a prediction accuracy for the vector read instruction based on a result of the page-table walk for the first active element.

15. The processor of claim 11, wherein the execution unit is configured to:
 determine elements to be processed in one or more dependent instructions based on set bit positions in the FSR.

16. The processor of claim 15, wherein when determining elements to be processed, the execution unit is configured to:
 use set bit positions in the FSR to generate or modify active elements in a predicate vector read for one or more dependent instructions.

17. The processor of claim 11, wherein the execution unit is configured to:
 receive a predicate vector; and
 use active elements in the predicate vector to determine the active elements of the vector read instruction.

18. The processor of claim 11, wherein, when determining that a page table walk for the vector read instruction is predictable as causing a page fault, the execution unit is configured to use one or more factors in making the determination.

19. The processor of claim 11, wherein the execution unit is configured to:
 indicate that the vector read instruction has completed when the memory reads have completed for the at least one of the first active element and other active elements for which TLB misses did not occur.

20. The processor of claim 11, wherein the vector read instruction is a VectorReadFF instruction.

21. A computer system, comprising:
 a processor;
 a memory coupled to the processor, wherein the memory stores instructions and data for the processor; and
 an execution unit in the processor, wherein the execution unit is configured to:
  while executing the vector read instruction, perform a lookup in a TLB for addresses in active elements in the vector read instruction;
  determine that a TLB miss occurred while performing the TLB lookup for the address from an active element other than a first active element;
  upon predicting that a page table walk for the vector read instruction will result in a page fault, set a bit in a corresponding bit position in an FSR for the active element for which the TLB miss occurred, wherein a set bit in a bit position in the FSR indicates that data in a corresponding element of the vector read instruction is invalid; and
  perform memory reads for at least one of the first active element and other active elements for which TLB misses did not occur.

22. The computer system of claim 21, wherein the execution mechanism is further configured to:
 send a request for a page table walk for the element for which the TLB miss occurred;
 upon receiving a result from the page table walk, determine if the prediction that the page table walk for the vector read instruction would result in a page fault was correct; and
 update a record of a prediction accuracy for the vector read instruction, wherein updating the record comprises increasing a value of the record relative to a threshold value when the prediction is correct, and decreasing the value of the record relative to the threshold value when the prediction is incorrect.

23. The computer system of claim 22, wherein, upon determining that the TLB miss occurred for the active element, the execution unit is configured to determine that the prediction accuracy for the vector read instruction is above the threshold value; and
 responsive to determining that the prediction accuracy is above a threshold value, the execution unit is configured to predict that the page table walk for instruction will result in a page fault.

24. The computer system of claim 21, wherein the execution unit is configured to:
 determine that a TLB lookup resulted in a TLB miss for the first active element;
 send a request for a page table walk for the address in the first active element without regard as to whether page table walks for the vector read instruction are predictable as causing page faults; and
 not update a record of a prediction accuracy for the vector read instruction based on a result of the page-table walk for the first active element.

25. The computer system of claim 21, wherein the execution unit is configured to:
 determine elements to be processed in one or more dependent instructions based on set bit positions in the FSR.

26. The computer system of claim 25, wherein when determining elements to be processed, the execution unit is configured to:
 use set bit positions in the FSR to generate or modify active elements in a predicate vector read for one or more dependent instructions.

27. The computer system of claim 21, wherein the execution unit is configured to:
 receive a predicate vector; and
 use active elements in the predicate vector to determine the active elements of the vector read instruction.

28. The computer system of claim 21, wherein, when determining that a page table walk for the vector read instruction is predictable as causing a page fault, the execution unit is configured to use one or more factors in making the determination.

29. The computer system of claim 21, wherein the execution unit is configured to:
 indicate that the vector read instruction has completed when the memory reads have completed for the at least one of the first active element and other active elements for which TLB misses did not occur.

30. The computer system of claim 21, wherein the vector read instruction is a VectorReadFF instruction.

* * * * *